(12) United States Patent  
Litwiller et al.

(10) Patent No.: US 6,750,755 B2
(45) Date of Patent: Jun. 15, 2004

(54) RETRACTABLE PIN ARRAY IDENTIFICATION APPARATUS AND METHOD

(75) Inventors: Debora Margaret Hejza Litwiller, Rochester, NY (US); Philip E. Blair, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 412 days.

(21) Appl. No.: 10/022,911

(22) Filed: Dec. 20, 2001

(65) Prior Publication Data

US 2003/0117264 A1 Jun. 26, 2003

(51) Int. Cl.[7] .......................... H04Q 9/00; G05B 19/00; G06F 7/00
(52) U.S. Cl. ..................... 340/5.67; 340/5.6; 340/5.7; 340/626; 340/686.1; 341/34; 439/341; 439/353
(58) Field of Search .................. 340/5.67, 5.6, 340/686.2, 626, 5.7, 825.56; 70/278.2, 278.3; 439/341, 353; 341/34

(56) References Cited

U.S. PATENT DOCUMENTS

| | | | |
|---|---|---|---|
| 4,948,459 A | * | 8/1990 | Van Laarhoven et al. .. 156/643 |
| 5,415,561 A | * | 5/1995 | Mavrin et al. ............. 439/341 |
| 6,633,797 B1 | * | 10/2003 | Akella et al. .............. 700/245 |

* cited by examiner

Primary Examiner—Michael Horabik
Assistant Examiner—Vernal Brown
(74) Attorney, Agent, or Firm—Fay, Sharpe, Fagan, Minnich & McKee, LLP

(57) ABSTRACT

An identification apparatus and method comprising an array of retractable pins in association with a housing attached to a base component through which each pin individually passes. The apparatus is attached to a primary device and in communication therewith. Each retractable pin is in individual physical contact with tension springs positioned below the pin and located in a containment sleeve within the housing. Each spring continuously exerts pressure on the base of their respective pins so as to push the pin up through the base component. At the base of each spring is a pressure sensitive pad in communication with the primary device. A set of shaped identifiers each having a plurality of holes through which respective pins on the array of retractable pins pass and each identifier uniquely configured with at least one distinct location containing a plug or 'cap' fitted therein which blocks the passage therethrough of that particular pin thereby forcing said pin to retract into the base component's housing underneath and exerting pressure on the pin's associated spring. Once one or more identifiers have been fitted onto the array of retractable pins, the primary device thereafter identifies the placed identifiers by each identifier's plug location and by the amount of pressure exerted by each spring's pressure sensitive pad. Once individual identifiers are known, the primary device can subsequently perform certain functions or other desired operations based on the type, configuration, and/or number of identifiers placed thereon.

2 Claims, 5 Drawing Sheets

RETRACTABLE PIN ARRAY IDENTIFICATION APPARATUS AND METHOD

RELATED CASES

The present invention is related to concurrently filed and co-pending U.S. patent application Ser. Nos. 10/022,915; 10/022,900; 10/022,914; 10/022,913, each of the above being incorporated by reference.

FIELD OF THE INVENTION

This invention is related in general to keying devices and other apparatus which can identify an end-user when properly fitted thereon and, more particularly, to those apparatus attached having an array of pins attached to a base component and requiring the physical attachment onto said array of pins one or more shaped keyed objects such that each object allows the physical passage of pins to pass therethrough.

BACKGROUND OF THE INVENTION

It is often required in the security field to secure doors and other equipment from access or usage by unauthorized persons. Typically, a magnetic card is swiped through a reader mechanism in order to identify the user requesting access or usage. Often, these magnetic cards are subject to being inadvertently erased by coming in close proximity with or otherwise physically touching a magnetic field or source thereby disabling the card from proper usage. Keys can also be utilized to permit access through certain doors but keys can be bent or broken thereby rendering them useless as well.

In addition, it is often necessary to physically attach one or more secondary devices to a primary device as accessory apparatus prior to the primary device's initialization and subsequent proper operation. In most instances, a machine is delivered to the end-user or customer with some assembly being required to be performed by the customer. It often is not possible for the devices' manufacturer's technical representatives to be present to monitor and otherwise ensure that secondary device attachment and installation to the primary device has been performed properly in advance of the machine's operation. Incorrect assembly can cause damage to the machine and/or cause injury to the customer. In addition, the primary device may configure itself differently depending on which accessory or secondary devices have been attached thereto. In the instance wherein the primary device is a copier machine, one particular or alternate configuration may be required of the primary device if there are more than one input paper trays attached thereto or multiple output trays attached thereto. As such, the primary device may need a user-friendly and quick method of determining which accessory devices have been attached.

What is needed in the arts is an identification apparatus which cannot be easily erased or broken and which, when placed onto a pin array of a primary device enables the primary device to identify the user requesting access or to identify which accessory devices have been connected or otherwise attached thereto.

SUMMARY OF THE INVENTION

What is disclosed herein is an identification apparatus and method comprising an array of retractable pins in association with a housing attached to a base component through which each pin individually passes. The apparatus is attached to a primary device and in communication therewith. Each retractable pin is in individual physical contact with spring tension means positioned below the pin and located in a containment sleeve within the housing. Each spring continuously exerts pressure on the base of their respective pins so as to push the pin up through the base component. At the base of each spring is a pressure sensitive pad in communication with the primary device. A set of shaped identifiers is also disclosed each having a plurality of holes through which respective pins on the array of retractable pins pass and each identifier uniquely configured with at least one distinct location containing a plug or 'cap' fitted therein which blocks the passage therethrough of that particular pin thereby forcing said pin to retract into the base component's housing underneath and exerting pressure on the pin's associated spring. Means for alignment and orientation are also disclosed. Once one or more identifiers have been fitted onto the array of retractable pins, the primary device thereafter identifies the placed identifiers by each identifier's plug location and by the amount of pressure exerted by each spring's pressure sensitive pad. Once individual identifiers are known, the primary device can subsequently perform certain functions or other desired operations based on the type, configuration, and/or number of identifiers placed thereon.

Advantages of the present invention, as described herein, may be realized and otherwise obtained by means particularly pointed out and distinctly claimed in the appended claims, taken in conjunction with the accompanying drawings and detailed specification.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

What is disclosed herein is an identification apparatus and method comprising an array of retractable pins in association with a housing attached to a base component through which each pin individually passes. The apparatus is attached to a primary device and in communication therewith. Each retractable pin is in individual physical contact with spring tension means positioned below the pin and located in a containment sleeve within the housing. Each spring continuously exerts pressure on the base of their respective pins so as to push the pin up through the base component. At the base of each spring is a pressure sensitive pad in communication with the primary device. A set of shaped identifiers is also disclosed each having a plurality of holes through which respective pins on the array of retractable pins pass and each identifier uniquely configured with at least one distinct location containing a plug or 'cap' fitted therein which blocks the passage therethrough of that particular pin thereby forcing said pin to retract into the base component's housing underneath and exerting pressure on the pin's associated spring. Means for alignment and orientation are also disclosed. Once one or more identifiers have been fitted onto the array of retractable pins, the primary device thereafter identifies the placed identifiers by each identifier's plug location and by the amount of pressure exerted by each spring's pressure sensitive pad. Once individual identifiers are known, the primary device can subsequently perform certain functions or other desired operations based on the type, configuration, and/or number of identifiers placed thereon.

Figure 1:
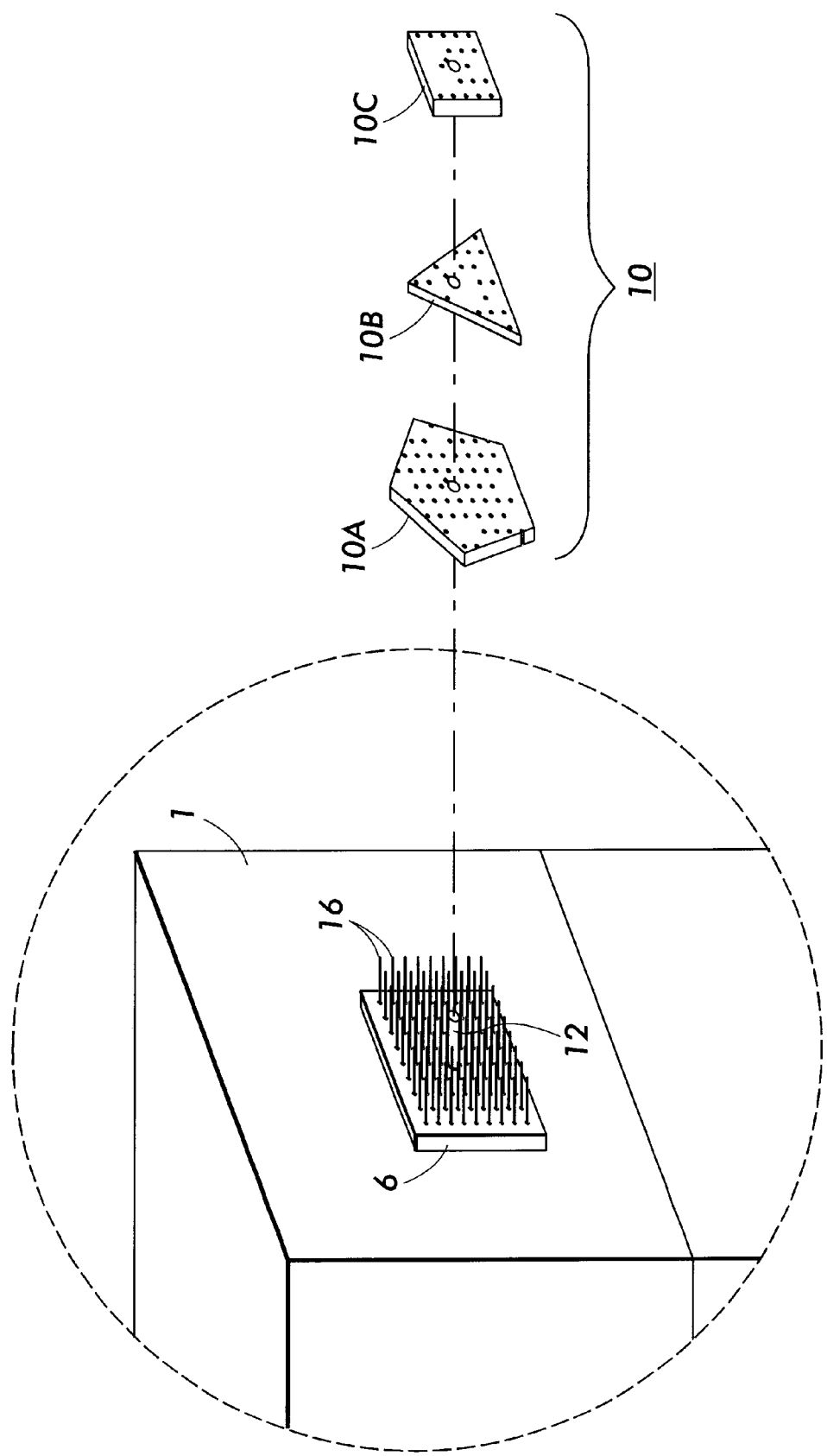
FIG. 1 shows a subsection of a primary device 1 upon which a base component 6 comprising a keyed center alignment post 12 and an array of retractable pins 16 and which illustrates the method of attaching shaped identifiers shown collectively at 10 and individually at 10A, 10B, and 10C onto the pin array.

Attention is directed to FIG. 1 which shows a subsection of a primary device 1 upon which a base component 6 comprising a keyed center alignment post 12 and an array of retractable pins 16 and which illustrates the method of attaching shaped identifiers collectively at 10 and individually as 10A, 10B, and 10C onto the pin array of the base component. Primary device 1 can be any device with multiple secondary devices attached each of which serve an intended purpose or which are required for the proper configuration and subsequent operation of the primary device. This would be in the instance wherein the primary device is, for example, a copier machine which arrives at the customer's business or office separated from one or more secondary devices each requiring physical attachment to or configuration with the primary device prior to the primary device's startup and proper operation. One such secondary device, for example, could be a paper tray while another secondary device, for example, would be a paper input device, and a third secondary device could perhaps be a specific type of output tray. Each secondary device would arrive with its own identifier, shown in FIG. 1 pentagonal, triangular, and rectangular shapes which, when placed onto the pin array of the base component indicates to the primary device that the corresponding secondary device has been installed. The primary device could then configure or re-configure itself to begin operation with the attached set of known secondary devices. In practice, the end-user or installation technician would take a first secondary device and physically attach it to the primary device and, thereafter, fit that particular secondary device's corresponding identifier onto the pin array of the base component, using keyed center post 12 or other alignment means in order to facilitate the proper orientation and placement thereon. Likewise, the end-user or installation technician would then physically attach another secondary device to the primary device and, thereafter, fit that secondary device's corresponding identifier onto the pin array of the base component. The process would be repeated until all required or otherwise desired secondary devices have been physically attached or have been placed in communication with or configured with the primary device and each secondary device's associated identifier has been fitted onto the base component's array of retractable pins. In such a manner and in accordance with the teachings of the present invention to be discussed further herein, the primary device is able to identify which specific secondary devices it has available to it.

In the instance wherein a sufficient number of secondary devices required for the proper or safe operation of the primary device have not been attached and their respective identifiers pressed onto the primary device's pin array then the primary device can signal the end-user or installation technician that some secondary device or devices are considered missing or unidentified or that the primary system has not yet been fully configured with all intended identifiers.

Alternatively, the installation technician could be in possession of a specific identifier which, when placed onto the pin array of the base component of the primary device, indicates to the primary device that the technician requires access to certain previously non-accessible components or that the technician is intending to perform certain service operations on the primary device. Upon placement onto the pin array of the technician's specific identifier, the primary device would recognize the technician and/or the specific operation intended to be performed and allow such maintenance to be done or perform certain operations.

Alternatively, the primary device could be a secured entryway, locked passageway, or security door blocking entrance into a room or building in which access is restricted to certain individuals. An individual in possession of, for example, the pentagonal shaped identifier of FIG. 1 which, when placed upon the pin array of the door's base component, would be granted access therein by a primary device with or without being limited or restricted to accessing further areas inside the room or building. In this same example, an individual in possession of, for example, the triangular identifier of FIG. 1 which, when said identifier is placed by that user onto the pin array of the primary device's base component would be granted different and perhaps further access rights therein with individual's using, for instance, the square identifier being treated differently. The primary device could be configured to do one or more internal operations once the identifier placed on the pin array has been accepted. Perhaps a user pin number, security code, or other identification means being further required for an additional measure of security. It should be understood that the present invention can find its uses in many differing applications and the examples provided are intended to be exemplary and are not to be considered limitations of the embodiments disclosed. As such, FIG. 1 is primarily for illustrative purposes and is not intended to serve in any way as a limitation.

Preferably, the primary device has a Central Processing Unit (CPU) located within the confines of the primary device although it should be understood that the base component of the present invention can be in communication with a CPU via a network or other signal or communication transmission means. In the instance wherein the base component of the present invention is using signal transmission means to communicate with a primary device or remote CPU, antenna means and supporting communication circuitry means would additionally be required in order to enable or otherwise facilitate the communication therebetween. Furthermore, it should also be understood that attachment of the base component of the present invention to the primary device is not limited to any particular location on the primary device but rather the location of the base component will be more of a design constraint depending on the type of primary device and the kinds of access or functionality intended by implementation thereof.

Figure 2:
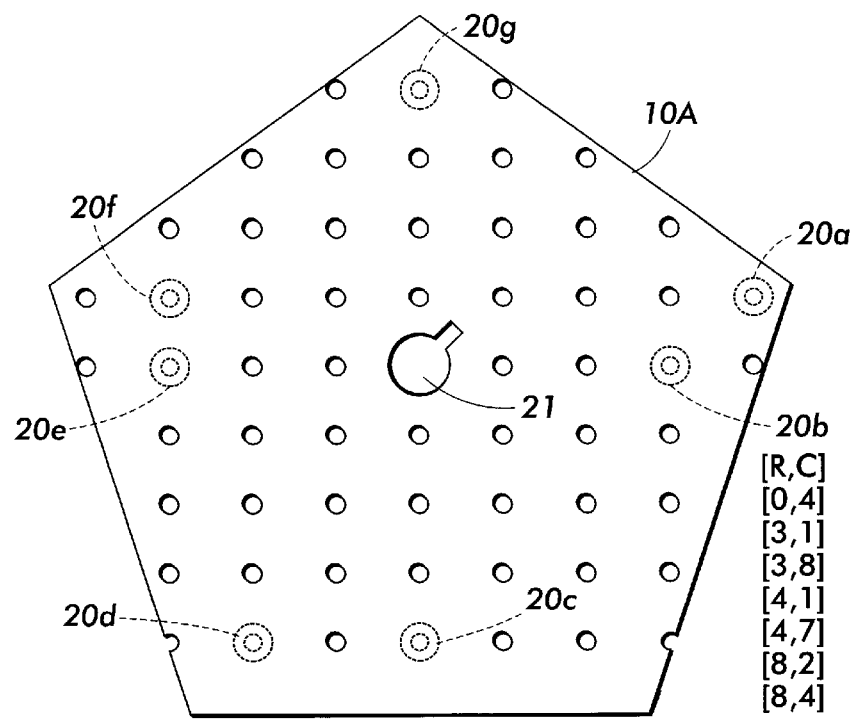
FIG. 2 is a top view of a pentagonal shaped identifier 10A of FIG. 1 illustrating a slot for the passage of the keyed center alignment post and a certain configuration of caps fitted therein which prevent the passage of the pin therethrough wherein said configuration is distinct from the configuration of the identifiers of FIGS. 3 and 4.
Figure 3:
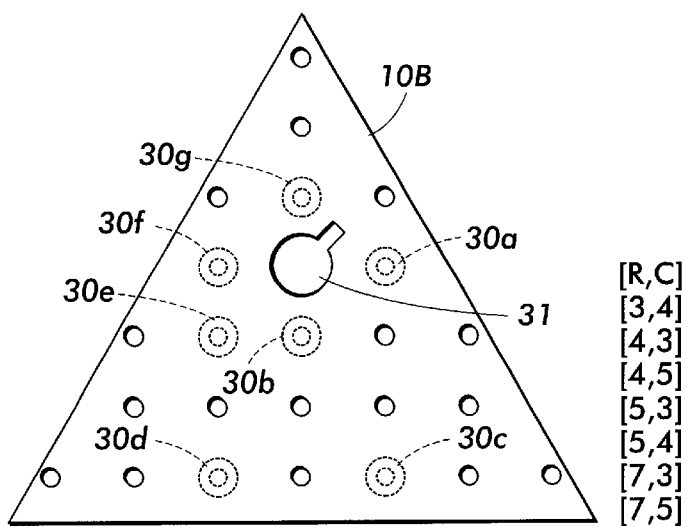
FIG. 3 is a top view of the triangular shaped identifier 10B of FIG. 1 illustrating a slot for the passage of the keyed center alignment post and having a configuration of caps fitted therein which prevent the passage of the pin therethrough wherein said configuration is distinct from the configuration of the identifiers of FIGS. 2 and 4.
Figure 4:
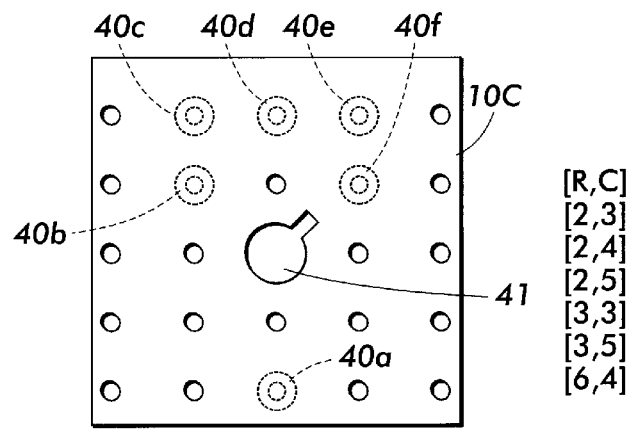
FIG. 4 is a top view of the rectangular shaped identifier 10C of FIG. 1 illustrating a slot for the passage of the keyed center alignment post and having a configuration of caps fitted therein which prevent the passage of the pin therethrough wherein said configuration is distinct from the configuration of the identifiers of FIGS. 2 and 3.

Attention is now directed to FIGS. 2–4 wherein FIG. 2 shows a slot for the passage of the keyed center alignment post and a certain configuration of caps fitted therein which prevent the passage of the pin therethrough wherein said configuration is distinct from the configuration of the identifiers of FIGS. 3 and 4. Likewise, FIG. 3 is a top view of the triangular shaped identifier 10B of FIG. 1 illustrating a slot for the passage of the keyed center alignment post and having a configuration of caps fitted therein which prevent the passage of the pin therethrough wherein said configuration is distinct from the configuration of the identifiers of FIGS. 2 and 4. Lastly, FIG. 4 is a top view of the rectangular shaped identifier 10C of FIG. 1 illustrating a slot for the passage of the keyed center alignment post and having a configuration of caps fitted therein which prevent the passage of the pin therethrough wherein said configuration is distinct from the configuration of the identifiers of FIGS. 2 and 3. It should be pointed out that other configurations of the keyed center post, such as having multiple keys or specific shapes are envisioned herein and are intended to be considered within the scope of the present invention.

In another embodiment envisioned herein, the base component and the individual identifiers have at least one edge which can be readily identified by color, shape, or other markings thereon such that the person placing the identifier onto the array of pins can properly orient the identifiers prior to pressing the identifier onto the retractable pins.

The identifiers illustrated are specifically configured with an array of holes having a one-to-one correspondence with the array of retractable pins 16 of FIG. 1 associated with the base component. The diameter of the individual holes, fitted with caps or otherwise, is such that each permits an individual pin to enter and contact said cap or pass completely therethrough when an identifier is pressed onto the pin array. Also shown are pre-selected locations on each identifier wherein caps have been fitted as shown in FIG. 2 at 20*a–g*, in FIG. 3 at 30*a–g*, and in FIG. 4 at 40*a–f*. In the embodiments shown, non-plugged holes in the identifiers allow the pins to pass through the body of the identifier unobstructed and locations which are plugged or wherein caps have been fitted do not allow the passage of the pin therethrough but rather cause the pin to retract into the housing beneath the base component. This prevents subsequently placed identifiers from utilizing that particular pin and exerts pressure onto the pressure detection means. Although the identifiers illustrated in FIGS. 2–4 are configured with a plurality of plugged holes or caps it should be understood that the number of caps per identifier is a design choice so long as any particular identifier has at least one cap in contact with one pin in order to exert pressure therethrough.

Figure 5:
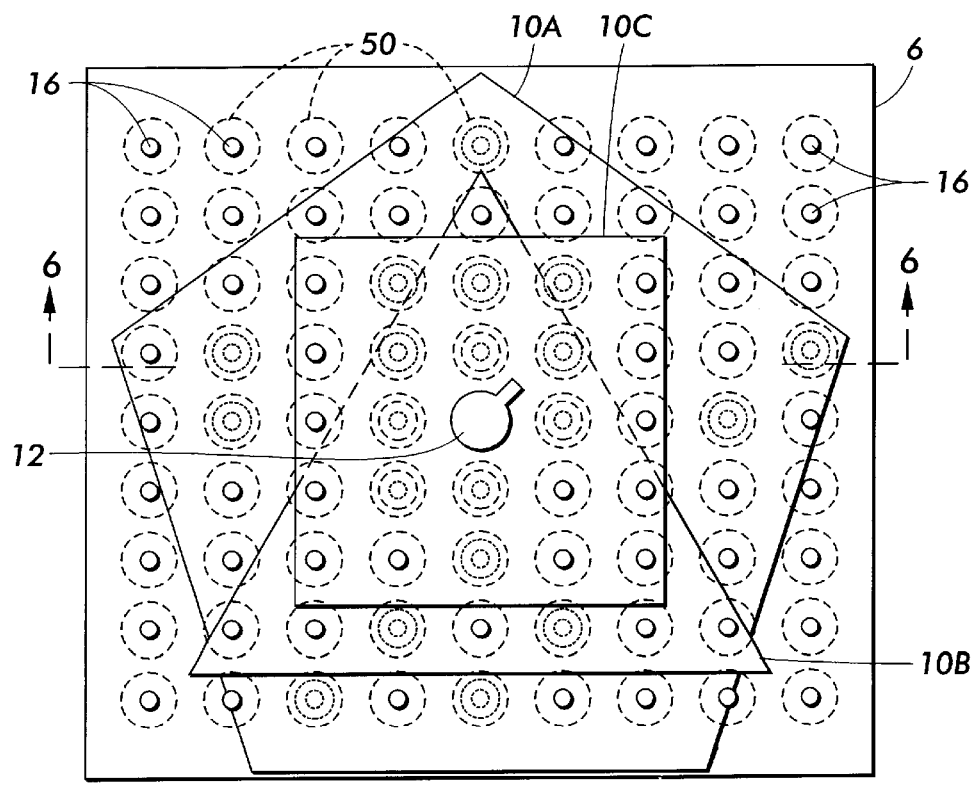
FIG. 5 is a top view of the base component 16 of FIG. 1 whereupon identifiers 10A, 10B, and 10C have been placed while indicating the location and direction of the cross-sectional view shown in FIG. 6.
Figure 6:
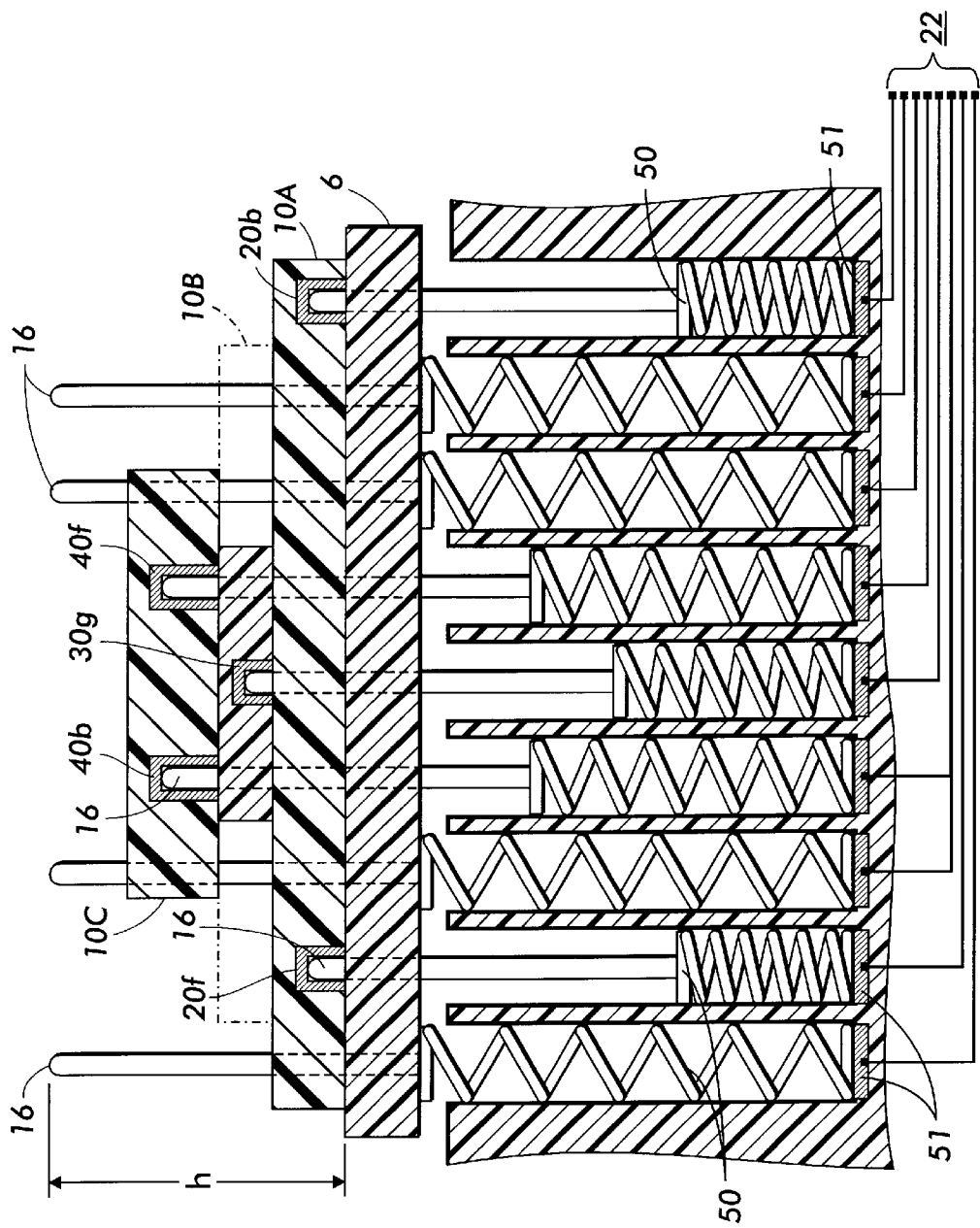
FIG. 6 illustrates the cross-sectional view of FIG. 5 in order to show that, preferably, height 'h' of the base component's pin array is sufficient to hold the individual identifiers 10A, 10B, and 10C, fitted thereon shown alternatively with varying degrees of thickness and to show communication means, collectively at 22 and individually at 51 used by the primary device to detect pressure exerted on said pins, and to show the retractable nature of each pin in the pin array.

Although it may not be obvious upon first glance, the identifiers illustrated in FIGS. 2–4 have been configured such that no two caps of separate identifiers contact the same pin along the pin's vertical axis. It is intended herein with this particular embodiment that each identifier have unique pin/cap combination configurations such that no two identifiers utilize the same pin to communicate with the primary device. In other words, once an identifier is configured to block a particular pin by the placement of a cap in a particular hole, the cap does not allow the passage of the pin therethrough thereby forcing the pin to retract into the housing beneath the base component. In such a manner, no other identifier amongst the stack of identifiers fitted onto the same pin array can utilize the same pins in their pin/cap configurations or 'plugged' locations. This is best seen in the illustration of FIG. 5 which is a top view of the base component 16 of FIG. 1 whereupon identifiers 10A, 10B, and 10C have been placed. FIG. 6 illustrates the cross-sectional view of FIG. 5 taken at the slice as indicated therein in order to show that height 'h' of the base component's pin array should be sufficient to hold the individual identifiers 10A, 10B, and 10C, shown alternatively with varying widths fitted thereupon and to show communication means, collectively at 22, for communicating with the primary device. Also shown in FIG. 6 at 50 are tension means positioned in the housing and in contact with the base of each of their respective pins such that tension is continuously exerted to the base of each pin in contact therewith to push said pin out through the base component. In the embodiment illustrated, the tension means are in a series of recesses located in the housing positioned beneath the base component in order to allow the pins to move freely upward and downward but also to prevent sideways movement. The housing can either be separate from the primary unit and the base component or integral with either or both. Each of the individual communication lines, shown collectively at 22, are connected to a pressure sensitive contact, shown individually at 51, to enable the primary device to detect the amount of pressure being exerted thereon by each spring. Still referring to FIG. 6, note that with respect to identifier 10A, caps 20*f* and 20*b* therein block their respective pins and, in doing so, push these pins down through the base component into the housing. With respect to identifier 10B, cap 30*g* contacts the top of its respective pin thereby causing that pin to be pushed downward as well. With respect to identifier 10C, caps 40*b* and 40*f* are fitted onto their respective pins which cause those pins to retract to an even lesser degree, as illustrated. It should be understood that other tensioning means other than the illustrated springs, such as pistons or a combination of functionality is envisioned herein and is to be considered within the scope of the present invention.

Figure 7:
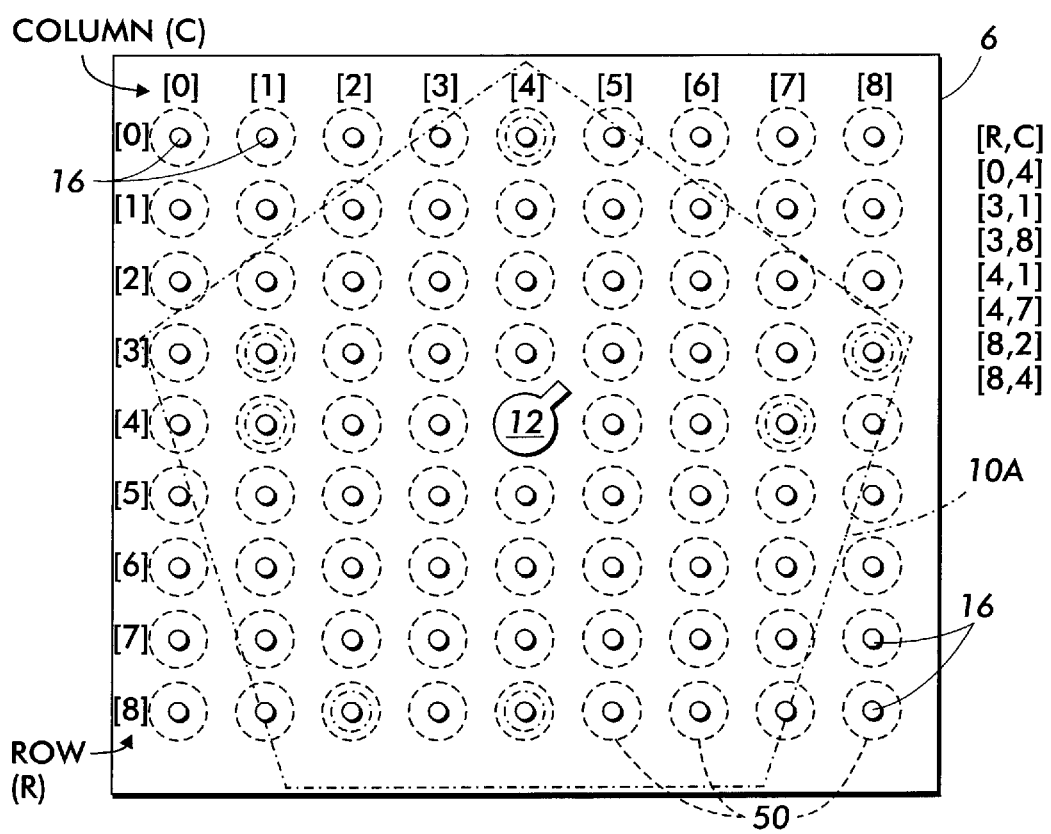
FIG. 7 is a top view of the base component 16 of FIG. 1 whereon a row and column have been labeled and numbered such that a matrix of the locations of capped holes on the pentagonal shaped identifier 10A of FIG. 2 can be obtained.

A method of detection is also disclosed enabling the primary device's pressure detection means to identify which identifiers have been pressed onto the pin array of the base component. Attention is now directed to FIG. 7 which illustrates the apparatus of the present invention wherein base component 6 has the pentagonal shaped identifier of FIG. 3, fitted thereon. The present method of detection utilizes pressure detection means 51 while taking advantage of the fact that no two caps contact the same pin by the uniqueness of each identifier's cap configuration since a cap prevents subsequently placed identifiers from utilizing the same pin by prohibiting the passage of the pin therethrough. Individual locations for each pin have to first be assigned. In the embodiment illustrated, base component 6 comprises a platform through which a 9×9 array of pins pass, shown collectively at 16, each pin being labeled from 0 to 8. Each pin enters their respective holes in the fitted identifier when said correctly oriented identifier was pressed onto the pin array. In this instance, proper orientation of the identifier onto the pin array was ensured by alignment means such as the keyed center alignment post. Starting at the upper left most pin, columns are identified thereon as those pins going across the array of retractable pins from left to right and rows being identified as going down the array from top to bottom, as shown. Notice in FIG. 6, that the first fitted identifier pushes the spring down into its respective housing the furthest while the second subsequently fitted identifier pushes the spring down to a lesser extent. The third identifier forces the springs down the least amount. Springs associated with those pins which passed completely through all the fitted identifiers exert little or no downward pressure on the spring. So, in the present method the primary device has to understand which pin locations are being used by the identifiers and to what extent or level of pressure is being exerted onto the pressure detection means 51 associated with each pin. As for the various used pin locations, the placement of pentagonal identifier onto the pin array has exerted pressure on pin [row, column] locations [(0,4), (3,1), (3,8), (4,1), (4,7), (8,2), (8,4)] corresponding to caps 20$c$, 20$f$, 20$a$, 20$e$, 20$b$, 20$d$, and 20$g$ respectively. Similarly and with reference to FIG. 5 and referring to the overlay of the triangular identifier of FIG. 3, locations [(3,4), (4,3), (4,5), (5,3), (5,4), (7,3), (7,5)] corresponding to caps 30$g$, 30$f$, 30$a$, 30$e$, 30$b$, 30$d$, and 30$c$ respectively comprises this identifier's particular pin/cap configuration. With reference to FIG. 5 and referring to the overlay of the square identifier of FIG. 4, locations [(2,3), (2,4), (2,5), (3,3), (3,5), (6,4)] corresponding to caps 40$c$, 40$d$, 40$e$, 40$b$, and 40$a$ respectively comprises this identifier's pin/cap configuration.

The primary device polls each respective pressure sensitive pad 51 in the array of pins to determine which [row, column] locations pin/cap contacts are exerting pressure. The pressure detecting means would preferably be sensitive to divide the entire traversal length of each pin into predetermined segments, for instance, 0 though 3 with 0 meaning that no pressure is being exerted by a particular pin/spring location and with 3 indicating the most pressure being exerted. In the example of FIG. 6, note that the first placed identifier 10A would exert the most pressure at level 3 while the last placed identifier 10C would exert the least pressure at level 1.

A polling of all the pin locations in the array indicates that the following locations have pressure greater than zero being exerted. The amount of pressure exerted 1 through 3 is also provided to the primary device by the pressure detection means. This is indicated by a subscript associated with each detected pin array location. Thus, the primary device receives the following set [$(0,4)_1$, $(2,3)_3$, $(2,4)_3$, $(2,5)_3$, $(3,1)_1$, $(3,3)_3$, $(3,4)_2$, $(3,5)_3$, $(3,8)_1$, $(4,1)_1$, $(4,3)_2$, $(4,5)_2$, $(4,7)_1$, $(5,3)_2$, $(5,4)_2$, $(6,4)_3$, $(7,3)_2$, $(7,5)_2$, $(8,2)_1$, $(8,4)_1$] comprising the set of all detected or 'used' pin array locations. It should be understood that all the primary device knows at this point is that these locations are considered capped but it has yet to determine which identifiers these pin/cap combinations refer to.

A comparison procedure is initiated wherein the primary device takes from the set of detected locations all those [row, column] locations associated with the subscript 1 which would be associated with a first placed identifier. This would be for the identifier configured to utilize the array locations [$(0,4)_1$, $(3,1)_1$, $(3,8)_1$, $(4,1)_1$, $(4,7)_1$, $(8,2)_1$, $(8,4)_1$]. The primary device would search its database of known identifiers and their respective pin/cap configuration values to find which identifier utilizes this and only this particular locations. Thus, the pentagonal identifier in its database matches this configuration and has therefore been identified. The primary device then removes or otherwise flags those locations in the set of detected locations associated with the pentagonal identifier as being accounted for. Removing the flagged locations from the set of detected locations generates the following remaining set of detected locations: [$(2,3)_3$, $(2,4)_3$, $(2,5)_3$, $(3,3)_3$, $(3,4)_2$, $(3,5)_3$, $(4,3)_2$, $(4,5)_2$, $(5,3)_2$, $(5,4)_2$, $(6,4)_3$, $(7,3)_2$, $(7,5)_2$]. The primary device would then move to those values within the set of detected locations being associated with a pressure level of 2. This would indicate that the second placed identifier must therefore be configured with the following locations: [$(3,4)_2$, $(4,3)_2$, $(4,5)_2$, $(5,3)_2$, $(5,4)_2$, $(7,3)_2$, $(7,5)_2$]. A comparison of these specific locations with known identifiers stored in the primary device's database produces a match with our triangular shaped identifier. Thus, the primary device has now obtained the identity of the second identifier fitted onto the base component's pin array. The primary device then removes or otherwise flags those locations in the set of detected locations associated with the triangular identifier as being accounted for. Removing the flagged locations from the set of detected locations generates the following remaining set of detected locations: [$(2,3)_3$, $(2,4)_3$, $(2,5)_3$, $(3,3)_3$, $(3,5)_3$, $(6,4)_3$]. The primary device would then move to those values within the set of detected locations being associated with a pressure level of 3. A comparison of each of these locations with those locations associated with known identifiers stored in its database produces a match at the square shaped identifier of FIG. 4. Thus, the primary device has now obtained the identity of the third identifier fitted onto the base component's pin array. When these matched locations are then removed from the set of remaining detected locations, the set becomes empty. Therefore, all detected pin/cap array locations have been accounted for and all identifiers known. In the instance wherein no match can be found in the database of stored known identifiers and their respective pin/cap configurations for one or more locations in the set of detected locations, the primary device can go into an alarm condition or initiate a predefined set of processes to indicate that a fault condition has occurred.

In summary, what has been disclosed is an identification apparatus and method comprising an array of retractable pins in association with a housing attached to a base component through which each pin individually passes. The apparatus is attached to a primary device and in communication therewith. Each retractable pin is in individual physical contact with spring tension means positioned below the pin and located in a containment sleeve within the housing. Each spring continuously exerts pressure on the base of their respective pins so as to push the pin up through the base component. At the base of each spring is a pressure sensitive pad in communication with the primary device. A set of shaped identifiers is also disclosed each having a plurality of holes through which respective pins on the array of retractable pins pass and each identifier uniquely configured with at least one distinct location containing a plug or 'cap' fitted therein which blocks the passage therethrough of that particular pin thereby forcing said pin to retract into the base component's housing underneath and exerting pressure on the pin's associated spring. Means for alignment and orientation are also disclosed. Once one or more identifiers have been fitted onto the array of retractable pins, the primary device thereafter identifies the placed identifiers by each identifier's plug location and by the amount of pressure exerted by each spring's pressure sensitive pad. Once individual identifiers are known, the primary device can subsequently perform certain functions or other desired operations based on the type, configuration, and/or number of identifiers placed thereon.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A method of determining specific identifiers fitted onto an array pins slidably retractable through a base component affixed to a primary device and affixed to a housing unit containing tension springs associated with each pin in the array which exert upward force on said pins to continuously push each pin through said base component, and wherein each of said identifiers has a plurality of holes therethrough with said base component's pins passing through each of their respective holes aligned therewith and has a certain predefined and unique configuration of holes plugged or 'capped' such that an associated pin is blocked from passing therethrough thereby causing said pin to retract down through said base component when said identifier is pressed onto said pin array; said downward pressure exerted onto said tension springs being sensed by a pressure sensor which communicates back to said primary device certain of pin location and amount of pressure being exerted thereon, and comprising the steps of:

a) defining for each of said pins in said pin array a format such that each pin has a unique location within said array of pins and defining unique values to each range of pressure values which can possibly be obtained by said pressure sensors;

b) polling each pin in the array to determine which of said pin locations are detected by said pressure sensors as having exerted pressure thereon and obtaining from said pressure sensors information as to the which specific pressure range the pressure being exerted on each of said detected pin locations falls into;

c) assembling said detected locations and obtained pressure ranges into a set of detected locations containing individual pin locations in the defined format and associating therewith the value pertaining to the sensed pressure range;

d) obtaining those locations which have been associated with a first value of a pressure range from the set of detected locations;

e) comparing the locations of each known identifier in a database of known identifiers and their respective pin locations to find a single identifier whose stored locations match the set locations which were associated with said first pressure range value and retaining information about said matching identifier;

f) obtaining those locations which have been associated with a next value of a pressure range from the set of detected locations;

g) repeating steps e through g until all locations in the set of detected locations have been accounted for or alternatively no more identifier locations in said database of stored identifier locations match those locations remaining in the set of detected locations; and h) in the event wherein no more identifier locations in said database of stored identifier locations comprise a proper subset of those locations remaining in the set of detected locations, initiating a predefined procedure which serves to indicate that an error condition has occurred.

2. A method as defined in claim 1 wherein said predefined format comprises (x,y) locations corresponding to the location of each pin in the array of pins.

* * * * *